United States Patent
Yamada et al.

(10) Patent No.: US 12,090,735 B2
(45) Date of Patent: Sep. 17, 2024

(54) LAMINATE, PACKAGING BAG, AND METHOD FOR MANUFACTURING SAME

(71) Applicant: TOYO SEIKAN CO., LTD., Tokyo (JP)

(72) Inventors: Toshiki Yamada, Yokohama (JP); Yuji Ueda, Yokohama (JP); Takahiro Yasuumi, Yokohama (JP); Koichi Ishizaka, Yokohama (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 0 days.

(21) Appl. No.: 17/793,474

(22) PCT Filed: Nov. 18, 2020

(86) PCT No.: PCT/JP2020/042943
§ 371 (c)(1),
(2) Date: Jul. 18, 2022

(87) PCT Pub. No.: WO2021/152969
PCT Pub. Date: Aug. 5, 2021

(65) Prior Publication Data
US 2023/0070188 A1  Mar. 9, 2023

(30) Foreign Application Priority Data
Jan. 31, 2020 (JP) ................. 2020-014380

(51) Int. Cl.
*B32B 27/08* (2006.01)
*B32B 7/027* (2019.01)
(Continued)

(52) U.S. Cl.
CPC .............. *B32B 27/08* (2013.01); *B32B 7/027* (2019.01); *B32B 7/12* (2013.01); *B32B 27/32* (2013.01);
(Continued)

(58) Field of Classification Search
CPC ........... B32B 27/08; B32B 7/027; B32B 7/12; B32B 27/32; B32B 2250/03;
(Continued)

(56) References Cited

U.S. PATENT DOCUMENTS

2016/0031191 A1  2/2016  Paulino

FOREIGN PATENT DOCUMENTS

GB          1583059 A  *  1/1981  ......... B29C 47/0023
JP        S60134852 A       7/1985
(Continued)

OTHER PUBLICATIONS

English machine translation for JP2001301833 which was cited by applicant in the IDS of Jul. 18, 2022 (Year: 2001).*

(Continued)

Primary Examiner — Michael C Miggins
(74) Attorney, Agent, or Firm — COZEN O'CONNOR

(57) ABSTRACT

Provided is a laminate that is excellent in heat sealing properties and is suitable for reuse. The laminate includes: a first layer having a melting point of $Tm_1$ and containing a first polyethylene alone as a resin; and a second layer having a melting point of $Tm_2$ and containing a second polyethylene alone as a resin, where: the first layer and the second layer are disposed respectively as outermost surfaces of the laminate; and $Tm_1 - Tm_2 \geq 24.0°$ C. is satisfied.

8 Claims, 2 Drawing Sheets

(51) Int. Cl.
  *B32B 7/12* (2006.01)
  *B32B 27/32* (2006.01)
(52) U.S. Cl.
  CPC ....... *B32B 2250/03* (2013.01); *B32B 2250/24* (2013.01); *B32B 2272/00* (2013.01); *B32B 2307/31* (2013.01); *B32B 2307/51* (2013.01); *B32B 2307/5825* (2013.01); *B32B 2307/732* (2013.01); *B32B 2439/00* (2013.01); *B32B 2553/00* (2013.01)
(58) Field of Classification Search
  CPC ............ B32B 2272/00; B32B 2250/24; B32B 2307/31; B32B 2307/51; B32B 2307/5825; B32B 2307/732; B32B 2439/00; B32B 2553/00
  See application file for complete search history.

(56) References Cited

FOREIGN PATENT DOCUMENTS

| | | | |
|---|---|---|---|
| JP | S6451940 A | 2/1989 | |
| JP | H02127041 A | 5/1990 | |
| JP | H0677135 B2 | 9/1994 | |
| JP | 2000167924 | * 6/2000 | ............ B29C 55/30 |
| JP | 2001301833 A | 10/2001 | |
| JP | 2006176620 A | 7/2006 | |
| JP | 2008-155549 A | 7/2008 | |
| JP | 2018-8453 A | 1/2018 | |
| JP | 2018008456 A | 1/2018 | |
| JP | 2018062072 A | 4/2018 | |
| JP | 2018062073 A | 4/2018 | |
| JP | 2019166810 A | 10/2019 | |
| JP | 2019171860 A | 10/2019 | |
| JP | 2019171861 A | 10/2019 | |
| JP | 2019189333 A | 10/2019 | |
| JP | 2019189334 A | 10/2019 | |
| JP | 2020055162 A | 4/2020 | |
| PL | 230652 | * 11/2018 | ............ B32B 27/32 |
| WO | 2019189092 A1 | 10/2019 | |

OTHER PUBLICATIONS

English machine translation for JP2001-301833. (Year: 2001).*
International Application No. PCT/JP2020/042943, International Search Report mailed Feb. 2, 2021, 4 pages.

* cited by examiner

LAMINATE, PACKAGING BAG, AND METHOD FOR MANUFACTURING SAME

This application is a national stage application of PCT/JP2020/042943 filed on Nov. 18, 2020, which claims priority to Japanese App. No. 2020-014380, filed on Jan. 31, 2020, the entirety of which is incorporated herein by reference.

TECHNICAL FIELD

The present invention relates to a laminate, and a packaging bag and a manufacturing method therefor.

BACKGROUND ART

PET bottles as well as plastic containers and packaging are items designated for recycling in Japan in view of environmental conservation. PET bottles typically contain PET (polyethylene terephthalate) alone as a resin and hence are easily recycled. Consequently, horizontal recycling has been established therefor. Meanwhile, plastic containers and packaging typically contain a plurality of resins, and it is difficult to separate these resins. Consequently, recycled products to be obtained are low in value.

Exemplary methods of enhancing the value of recycled products from plastic containers and packaging include a method of using a single resin alone as a component resin of plastic containers and packaging (monomaterial packaging). Since plastic containers and packaging contain a single resin alone as a resin in this method, easy recycling is possible without any need to separate into each resin. Moreover, since recycled products to be obtained have high purity, it is possible to provide recycled products of high value.

Meanwhile, packaging bags, such as liquid refill pouches, are commonly formed from a laminate including a polyethylene layer as a bonding layer for heat sealing, a nylon layer that exhibits heat resistance and pinhole resistance, and, as necessary, a PET layer that exhibits flavor barrier properties. Such laminates specifically have a layer structure of polyethylene layer/nylon layer, polyethylene layer/PET layer/nylon layer, and so forth. A packaging bag can be manufactured, for example, by pressing seal bars on the respective nylon layer sides of such laminates and elevating the temperature of the seal bars to melt the respective polyethylene layers, thereby bonding the laminates. Such a packaging bag falls into the category of plastic containers and packaging and hence is recycled. Accordingly, a monomaterial packaging bag is desirable from a viewpoint of enhancing the value of recycled products as mentioned above.

Patent Literature (PTL) 1 to 10, for example, disclose a laminate containing polyethylene as a resin.

CITATION LIST

Patent Literature

PTL 1: Japanese Unexamined Patent Application Publication No. 64-51940
PTL 2: Japanese Examined Patent Publication No. 6-77135
PTL 3: Japanese Unexamined Patent Application Publication No. 60-134852
PTL 4: Japanese Unexamined Patent Application Publication No. 2018-8456
PTL 5: Japanese Unexamined Patent Application Publication No. 2018-62072
PTL 6: Japanese Unexamined Patent Application Publication No. 2018-62073
PTL 7: Japanese Unexamined Patent Application Publication No. 2019-171860
PTL 8: Japanese Unexamined Patent Application Publication No. 2019-171861
PTL 9: Japanese Unexamined Patent Application Publication No. 2019-189333
PTL 10: Japanese Unexamined Patent Application Publication No. 2019-189334

SUMMARY OF INVENTION

Technical Problem

Aiming at a monomaterial packaging bag, the present inventors prepared a packaging bag using a film solely consisting of polyethylene layers instead of using a laminate including a nylon layer and a PET layer stacked on a polyethylene layer. However, when the temperature of seal bars was elevated during heat sealing, the seal bars were stuck to the melt polyethylene layer surfaces. Consequently, it was impossible to perform heat sealing at a sufficiently high temperature and hence to attain satisfactory sealing strength in the sealed portion. Moreover, since the seal bars were stuck to the melt polyethylene layer surfaces, the resulting packaging bag had defective appearance.

In view of the above, an object of the present invention is to provide a laminate that is excellent in heat sealing properties and is suitable for reuse.

Solution to Problem

An laminate according to the present invention includes: a first layer having a melting point of $Tm_1$ and containing a first polyethylene alone as a resin; and a second layer having a melting point of $Tm_2$ and containing a second polyethylene alone as a resin, where: the first layer and the second layer are disposed respectively as outermost surfaces of the laminate; and $Tm_1 - Tm_2 \geq 24.0°$ C. is satisfied.

A packaging bag according to the present invention includes the laminate according to the present invention.

A method of manufacturing a packaging bag according to the present invention, includes heat sealing the laminate according to the present invention.

Advantageous Effects of Invention

According to the present invention, it is possible to provide a laminate that is excellent in heat sealing properties and is suitable for reuse.

DESCRIPTION OF EMBODIMENTS

Figure 1:
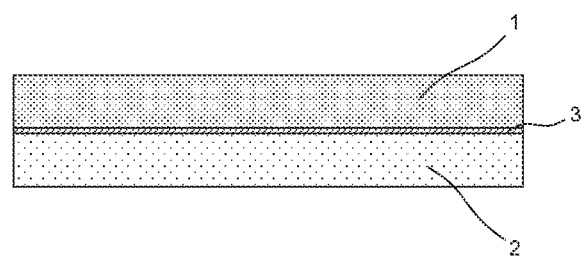
FIG. 1 is a cross-sectional view of an exemplary laminate according to the present invention.

Laminate
A laminate according to the present invention includes: a first layer having a melting point of $Tm_1$ and containing a first polyethylene alone as a resin; and a second layer having a melting point of $Tm_2$ and containing a second polyethylene alone as a resin. The first layer and the second layer are disposed respectively as outermost surfaces of the laminate. In other words, the first layer is either of the outermost surface layers of the laminate, and the second layer is the other outermost surface layer of the laminate. Here, the melting point $Tm_1$ and the melting point $Tm_2$ have a relationship of $Tm_1-Tm_2 \geq 24.0°$ C.

In the laminate according to the present invention, two layers different in melting point by 24.0° C. or more are stacked respectively as the outermost surface layers. The first layer as a high-melting layer exhibits high heat resistance. For this reason, when heat sealing is performed by pressing a seal bar on the first layer, it is possible to suppress melt sticking to the seal bar even when the temperature of the seal bar is elevated. Consequently, heat sealing is possible at a high temperature. Further, the second layer as a low-melting layer melts at a low temperature and thus readily melts with heat transferred from the first layer. Consequently, bonding at satisfactory sealing strength is possible. As just described, the laminate according to the present invention is excellent in heat sealing properties. Moreover, since the first layer and the second layer contain polyethylene alone as a resin, the laminate is suitable for reuse. Consequently, it is possible to provide recycled products of high purity and high value.

The laminate according to the present invention includes at least the first layer and the second layer as outermost surface layers and may include other layers as intermediate layers. Exemplary other layers include a recycled layer from laminates, a bonding layer, an adhesive layer, a printed layer, a barrier layer, a layer for imparting easy openability, and other functional layers. Moreover, one such functional layer may have a plurality of functions. The laminate may include one or two or more of these layers.

From a viewpoint of increasing the purity of recycled products from laminates, the mass ratio of polyethylene contained in each laminate, relative to 100 mass % for all the resins contained in the laminate, is preferably 90 mass % or more, more preferably 95 mass % or more, further preferably 99 mass % or more, and particularly preferably 100 mass %, in other words, the laminate contains polyethylene alone as a resin. Here, the laminate may not contain nylon. Examples of the nylon include nylon 6, nylon 66, nylon 11, and nylon 12.

The laminate may contain, in addition to resins, other components, such as a thermosetting resin, a metal, and a metal oxide. From a viewpoint of increasing the purity of recycled products from laminates, the content of other components is preferably 5 mass % or less and more preferably 1 mass % or less relative to 100 mass % for each laminate.

The thickness of the entire laminate is preferably 10 to 500 μm and more preferably 50 to 200 μm. The total thickness ratio of the first layer and the second layer is preferably 1 to 100% and more preferably 5 to 100% relative to 100% for the thickness of the entire laminate.

An exemplary laminate according to the present invention is illustrated in FIG. 1. The laminate illustrated in FIG. 1 includes a first layer 1 that is a stretched film of a first polyethylene, a second layer 2 that is an unstretched film of a second polyethylene, and an adhesive layer 3 for bonding the first layer 1 and the second layer 2. The first layer has a melting point $Tm_1$ higher than the melting point $Tm_2$ of the second layer 2 by 24.0° C. or more. Here, from a viewpoint of increasing the purity of recycled products from laminates, the adhesive layer 3 preferably has a smaller thickness and is preferably omitted when direct bonding between the first layer 1 and the second layer 2 is possible.

Figure 2:
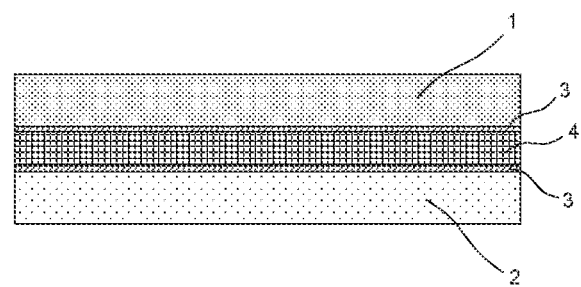
FIG. 2 is a cross-sectional view of another exemplary laminate according to the present invention.

Another exemplary laminate according to the present invention is illustrated in FIG. 2. The laminate illustrated in FIG. 2 includes a first layer 1 that is a stretched film of a first polyethylene, a second layer 2 that is an unstretched film of a second polyethylene, and a recycled layer 4 from laminates. Moreover, the laminate also includes adhesive layers 3 respectively between the first layer 1 and the recycled layer 4 as well as between the second layer 2 and the recycled layer 4. The first layer 1 has a melting point $Tm_1$ higher than the melting point $Tm_2$ of the second layer 2 by 24.0° C. or more. As in the case of the laminate illustrated in FIG. 1, the adhesive layers 3 preferably have a smaller thickness and are preferably omitted when direct bonding between the first layer 1 and the recycled layer 4 as well as between the second layer 2 and the recycled layer 4 is possible. Here, the laminate may include a plurality of recycled layers 4 or may further include other layers.

(First Layer)

The first layer according to the present invention contains a first polyethylene alone as a resin. In other words, all the resins contained in the first layer is the first polyethylene, or the first layer does not contain other resins excluding the first polyethylene. Here, the first polyethylene may contain a plurality of types of polyethylenes. In the present invention, the term "resin" indicates a melt-extrudable thermoplastic resin.

Examples of the first polyethylene include high density polyethylene (HDPE), medium density polyethylene (MDPE), linear low density polyethylene (LLDPE), low density polyethylene (LDPE), and ethylene-α-olefin copolymers. The first polyethylene may contain one or two or more of these polyethylenes. Among these, high density polyethylene (HDPE), which has a high melting point, is preferable as the first polyethylene. When the first polyethylene contains HDPE, the mass ratio of HDPE is preferably 50 mass % or more and more preferably 70 mass % or more relative to 100 mass % for the first polyethylene. Moreover, the first polyethylene may consist of HDPE or may consist of HDPE and LLDPE. Further, the first polyethylene may be derived from a petroleum raw material or a plant raw material or may be a mixture of those derived therefrom. Furthermore, the first polyethylene may contain a recycled material.

The first layer is preferably a stretched film of the first polyethylene. By stretching the first polyethylene, it is possible to increase the melting point of the first layer. Moreover, since the pinhole resistance (puncture strength) increases by stretching, the laminate is particularly suitably used for a packaging bag for storing a liquid. The stretching ratio is preferably 1.2 to 10 times and more preferably 2 to 6 times. Moreover, the stretching may be uniaxial stretching or biaxial stretching.

The first layer has a inciting point $Tm_1$ higher than the melting point $Tm_2$ of the second layer by 24.0° C. or more, preferably 27.0° C. or more, and more preferably 30.0° C. or more. When the difference in melting point ($Tm_1-Tm_2$) is 24.0° C. or more, it is possible to enhance heat resistance of the first layer and, at the same time, to melt the second layer at a low temperature, thereby improving heat sealing properties. The upper limit for the range of the difference in melting point is not particularly limited but may be 50.0° C. or less, for example. In the present invention, the melting point of each layer is a value measured in accordance with JIS K 7121-1987 by DSC under conditions of a temperature rising rate of 10° C./min.

The melting point $Tm_1$ of the first layer is not particularly limited provided that the melting point is higher than the melting point $Tm_2$ of the second layer by 24.0° C. or more but is preferably 130.0° C. or higher, more preferably 132.0° C. or higher, and further preferably 135.0° C. or higher from a viewpoint of enabling heat sealing at a further high temperature.

The thickness of the first layer is preferably 40 μm or less and more preferably 30 μm or less from a viewpoint of increasing heat transfer to the second layer during heat sealing. The lower limit for the thickness range of the first layer is not particularly limited but may be 1 μm or more, for example. Further, the thickness ratio of the first layer is preferably 10 to 50%, more preferably 15 to 45%, and further preferably 20 to 40% relative to 100% for the thickness of the entire laminate from a viewpoint of enhancing adhesion and increasing heat transfer to the second layer during heat sealing.

The first layer may contain, in addition to the first polyethylene, additives commonly used for polyethylene-based films, such as a lubricant, an antioxidant, and an antiblocking agent, as other components excluding resins. Nevertheless, the mass ratio of the first polyethylene, relative to 100 mass % for the first layer, is preferably 90 mass % or more, more preferably 95 mass % or more, further preferably 99 mass % or more, and particularly preferably 100 mass %, in other words, the first layer consists of the first polyethylene.

The first layer surface may be printed using an ink that is removable in the recycling step.

(Second Layer)

The second layer according to the present invention contains a second polyethylene alone as a resin. In other words, all the resins contained in the second layer is the second polyethylene, or the second layer does not contain other resins excluding the second polyethylene. Here, the second polyethylene may contain a plurality of types of polyethylenes. Moreover, the second polyethylene may be polyethylene of the same type as or different type from the first polyethylene.

Examples of the second polyethylene include high density polyethylene (HDPE), medium density polyethylene (MDPE), linear low density polyethylene (LLDPE), low density polyethylene (LDPE), and ethylene-α-olefin copolymers. The second polyethylene may contain one or two or more of these polyethylenes. Among these, linear low density polyethylene (LLDPE), which has a low melting point, is preferable as the second polyethylene. When the second polyethylene contains LLDPE, the mass ratio of LLDPE is preferably 50% or more and more preferably 70% or more relative to 100 mass % for the second polyethylene. Moreover, the second polyethylene may consist of LLDPE or may consist of LLDPE and LDPE. When the second polyethylene consists of LLDPE and LDPE, the mass ratio of LLDPE to LDPE preferably satisfies LLDPE/LDPE=50 to 90/50 to 10. By incorporating LDPE in addition to LLDPE into the second polyethylene, processability improves due to increase in melt tension. Further, the second polyethylene may be derived from a petroleum raw material or a plant raw material or may be a mixture of those derived therefrom. Furthermore, the second polyethylene may contain a recycled material.

The second layer is preferably an unstretched film of the second polyethylene. When the second polyethylene is not stretched, it is possible to lower the melting point of the second layer.

The melting point $Tm_2$ of the second layer is not particularly limited provided that the melting point is lower than the melting point $Tm_1$ of the first layer by 24.0° C. or more but is preferably 115.0° C. or lower, and more preferably 110.0° C. or lower, and further preferably 107.0° C. or lower from a viewpoint of melting sufficiently at a further low temperature and attaining high sealing strength.

The thickness of the second layer is preferably 50 μm or more and more preferably 60 μm or more from a viewpoint of enabling satisfactory bonding during heat sealing. The upper limit for the thickness range of the second layer is not particularly limited but may be 400 μm or less, for example. The thickness ratio of the second layer is preferably 50 to 90%, more preferably 55 to 85%, and further preferably 60 to 80% relative to 100% for the thickness of the entire laminate from a viewpoint of enhancing adhesion and increasing heat transfer to the second layer during heat sealing.

The thickness ratio of the second layer is preferably 50 to 90%, more preferably 55 to 85%, and further preferably 60 to 80% relative to 100% for the total thickness of the first layer and the second layer from a viewpoint of enhancing adhesion and increasing heat transfer to the second layer during heat sealing.

The second layer may contain, in addition to the second polyethylene, additives commonly used for polyethylene-based films, such as a lubricant, an antioxidant, and an antiblocking agent, as other components excluding resins. Nevertheless, the mass ratio of the second polyethylene, relative to 100 mass % for the second layer, is preferably 90 mass % or more, more preferably 95 mass % or more, further preferably 99 mass % or more, and particularly preferably 100 mass %, in other words, the second layer consists of the second polyethylene.

(Recycled Layer)

The laminate according to the present invention preferably further includes, in addition to the first layer and the second layer, a recycled layer from laminates according to the present invention in view of environmental conservation. Such a recycled layer can be produced, for example, through pulverization, cleaning, remelting and extrusion, and formation into a film of wastes and rejects generated during the manufacture of laminates according to the present invention and packaging bags using such laminates as well as used laminates and packaging bags after having been marketed.

From a viewpoint of increasing the purity of recycled products from laminates, the mass ratio of polyethylene contained in the recycled layer is preferably 90 mass % or more and more preferably 99 mass % or more relative to 100 mass % for all the resins contained in the recycled layer.

The thickness of the recycled layer is not particularly limited but is preferably 2 to 400 μm and more preferably 10 to 200 μm. The thickness ratio of the recycled layer is preferably 1 to 99% and more preferably 10 to 90% relative to 100% for the thickness of the entire laminate.

Here, whether a layer included in the laminate is a recycled layer can be determined, for example, by the fact that the layer has two or more glass transition temperatures or melting points or contains an adhesive. The glass transition temperature and the melting point can be observed by DSC (differential scanning calorimetry). The presence or absence of an adhesive can be confirmed by chemical analysis, such as IR (infrared spectroscopy).

(Adhesive Layer)

The laminate according to the present invention may optionally include one or more adhesive layers for bonding the respective layers that constitute the laminate. For example, when the first layer is a stretched film, the film of the first layer and another layer can be bonded to each other via an adhesive layer. Exemplary adhesives contained in an adhesive layer include urethane, acid-modified polyolefin, polyester, polyether, and polyamide adhesives. An adhesive layer may contain one or two or more of these adhesives.

The thickness of an adhesive layer is not particularly limited and may be 0.1 to 10 μm, for example. Moreover, the thickness ratio of an adhesive layer may be, for example, 0.01 to 10% relative to 100% for the thickness of the entire laminate. Here, when the laminate includes a plurality of adhesive layers, the ratio indicates the total thickness ratio of all the adhesive layers relative to 100% for the thickness of the entire laminate. Further, from a viewpoint of increasing the purity of recycled products from laminates, an adhesive layer preferably has a smaller thickness and more preferably is not provided.

(Physical Properties of Laminate)

The laminate according to the present invention has a puncture strength of preferably 5 N or more, more preferably 6 N or more, and further preferably 6.5 N or more. When the puncture strength falls within such ranges, it is possible to have high pinhole resistance and hence to suppress liquid leakage satisfactorily particularly when a packaging bag for storing a liquid is manufactured using the laminate. The upper limit for the range of the puncture strength is not particularly limited. The puncture strength is measured in accordance with JIS Z 1707 (1997), and the average of the measured number n=3 is regarded as a measured value.

(Manufacturing Method for Laminate)

Although the manufacturing method is not particularly limited, the laminate according to the present invention can be manufactured, for example, by coextruding a material for forming the first layer, a material for forming the second layer, and, as necessary, materials of other layers, such as a recycled layer. Alternatively, when the first layer is a stretched film, the laminate can be manufactured, for example, by bonding the film of the first layer, a film of the second layer, and, as necessary, other layers, such as a recycled layer, via adhesive layers mentioned above.

Packaging Bag

A packaging bag according to the present invention includes the laminate according to the present invention. The packaging bag according to the present invention may consist of laminates according to the present invention. The packaging bag according to the present invention can be formed by heat sealing, as bonding surfaces, the respective second layers of laminates according to the present invention and exhibits high sealing strength since heat sealing is possible at a high temperature. For this reason, it is possible to suppress liquid leakage, for example, even when the packaging bag is filled inside with a liquid. Moreover, even when heat sealing is performed at a high temperature by bringing seal bars into contact with the respective first layer surfaces of the laminates, the resulting packaging bag exhibits satisfactory appearance since the surface melting is suppressed. Further, such a packaging bag, which consists of laminates according to the present invention, is suitable for reuse. In particular, since high pinhole resistance is exhibited when the first layers are stretched films, the packaging bag is suitable as a packaging bag for storing a liquid.

Figure 3:
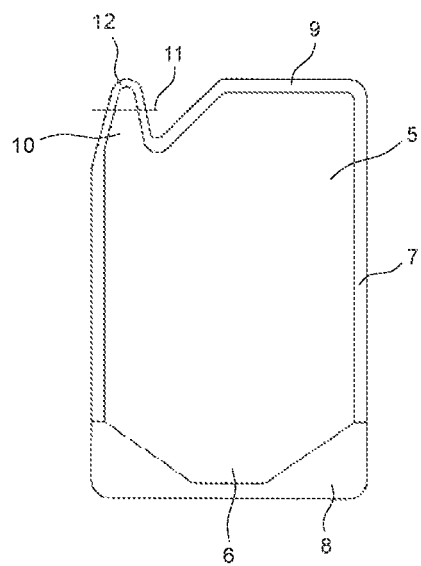
FIG. 3 schematically illustrates an exemplary liquid refill pouch as an example of a packaging bag according to the present invention.

As an example of the packaging bag for storing a liquid according to the present invention, an exemplary liquid refill pouch is illustrated in FIG. 3. The liquid refill pouch illustrated in FIG. 3 has a body portion 5 and a bottom portion 6. The body portion 5 is formed from two laminates according to the present invention, and the bottom portion 6 is formed from one laminate according to the present invention. By heat sealing the two laminates for forming the body portion 5, a side seal 7 and a top seal 9 are formed. Moreover, by heat sealing the two laminates for forming the body portion 5 and one laminate for forming the bottom portion 6, a bottom seal 8 is formed. At either upper corner of the body portion 5, a nozzle section 10 that protrudes upward is provided. The nozzle section 10 is provided with a tear line 11, and a spout for pouring out the contents is formed by opening through tearing off of, along the tear line 11, a tip portion 12 of the nozzle section 10. The contents can be poured into another container, such as a plastic bottle or a glass bottle, by inserting the spout into the inlet port of the container and by tilting the refill pouch. Exemplary contents of the liquid refill pouch include detergent, bleach, fabric softener, laundry starch, shampoo, conditioner, cosmetics, and deodorant.

Manufacturing Method for Packaging Bag

The method of manufacturing a packaging bag according to the present invention includes heat sealing the laminate according to the present invention. Since a packaging bag is manufactured using the laminate according to the present invention in this method, it is possible to obtain a packaging bag having excellent heat sealing properties and high sealing strength in the sealed portion. Moreover, since surface melting can be suppressed during heat sealing, it is possible to obtain a packaging bag having satisfactory appearance.

An exemplary method of manufacturing a packaging bag according to the present invention will be described hereinafter. First, two laminates according to the present invention are prepared, and either of the laminates is placed on top of the other such that the respective second layers face each other. Next, seal bars set to a predetermined temperature are pressed on the first layer surfaces corresponding to a seal portion. The temperature for heat sealing the laminates, although depending on the melting point $Tm_1$ of the first layers, is preferably 130° C. or higher, more preferably 145° C. or higher, and further preferably 160° C. or higher from a viewpoint of sufficiently melting the second layers and attaining high sealing strength. Such seal portions can be formed on sides excluding one side for filling with the contents. A packaging bag is thus obtained. Later, the packaging bag is filled with the contents from the remaining open side, and a packaging bag filled with the contents is obtained by heat sealing the side.

EXAMPLES

Hereinafter, the present invention will be described further specifically by means of working examples. However, the present invention is by no means limited by these examples. The melting point of each layer, the upper limit temperature for sealing, the sealing strength and the puncture strength were measured by the methods below.

Melting Point of Each Layer

The melting point of each layer was measured in accordance with JIS K 7121-1987 by DSC (from PerkinElmer, Inc.) under conditions of a temperature rising rate of 10° C./min. When a plurality of peaks were observed, a main peak with the largest amount of heat absorbed was regarded as the melting point.

Upper Limit Temperature for Sealing

Either of two laminates was placed on top of the other such that the respective second layers face each other and then heat-sealed by pressing seal bars set to a predetermined temperature on the respective first layers. On this occasion, the limit temperature at which sealing is possible without melting the first layer surfaces was regarded as the upper limit temperature for sealing. The presence or the absence of melting of the first layer surfaces was visually observed.

Sealing Strength

The sealing strength was measured in accordance with JIS Z 0238 (1998) using an autograph (from Shimadzu Corporation) at a tensile speed of 300 mm/min and a sample width of 15 mm.

Puncture Strength

The puncture strength of each laminate was measured in accordance with JIS Z 1707 (1997). The average of the measured number n=3 was regarded as a measured value.

Example 1

A laminate illustrated in FIG. 1 comprising a first layer 1 and a second layer 2 bonded via an adhesive layer 3 was prepared. Specifically, a uniaxially stretched HDPE film (melting point: 139.0° C., thickness: 25 μm) as a first layer and an unstretched LLDPE film (melting point: 107.0° C., thickness: 60 μm) as a second layer were prepared respectively. The laminate was obtained through dry lamination of the first layer and the second layer using a urethane adhesive (applied amount of 3.5 g/m$^2$). The melting points of the first layer and the second layer, the upper limit temperature for sealing, the sealing strength, and the puncture strength were measured by the above-described methods. The results are shown in Table 1.

Example 2

As the first layer, a uniaxially stretched HDPE film (melting point: 132.2° C., thickness: 25 μm) was used. Except for this, a laminate was prepared and evaluated in the same manner as Example 1. The results are shown in Table 1.

Example 3

As the first layer, a uniaxially stretched HDPE film (melting point: 132.2° C., thickness: 30 μm) was used. Except for this, a laminate was prepared and evaluated in the same manner as Example 1. The results are shown in Table 1.

Example 4

A laminate illustrated in FIG. 2, in which a first layer 1 and a recycled layer 4 as well as a second layer 2 and the recycled layer 4 are respectively bonded via adhesive layers 3, was prepared. A packaging bag produced in Example 6 described hereinafter was pulverized by a plastic crusher. The resulting crushed product was fed to a twin-screw extruder (barrel set temperature: 240° C.) equipped with a granulator and re-pelletized. Further, the regenerated pellets were fed to a single-screw extruder equipped with a T-die of 300 mm in width and a film take-up unit (T-die and barrel set temperature: 255° C.) and formed into a recycled film of 30 μm in thickness.

Subsequently, blended pellets of LLDPE resin (MFR: 0.8 g/min) and LDPE resin (MFR: 2.0 g/min) at a mass ratio of LLDPE/LDPE=7/3 were fed to a single-screw extruder equipped with a T-die of 300 mm in width and a film take-up unit (T-die and barrel set temperature: 200° C.) and formed into a film of 30 μm in thickness for a second layer. The film had a melting point of 107.0° C.

Further, the recycled film as a recycled layer was sandwiched between a first layer as used in Example 2 and the film for a second layer. A laminate was obtained through dry lamination of these films using a urethane adhesive (applied amount of 3.5 g/m$^2$).

Comparative Example 1

As the first layer, an unstretched HDPE film (melting point: 130.6° C., thickness: 30 μm) was used. Except for this, a laminate was prepared and evaluated in the same manner as Example 1. The results are shown in Table 1.

Comparative Example 2

As the first layer, an unstretched HDPE film (melting point: 128.9° C., thickness: 40 μm) was used. Except for this, a laminate was prepared and evaluated in the same manner as Example 1. The results are shown in Table 1.

TABLE 1

| | First layer | | | Second layer | | | Recycled | Difference in | | | Laminate physical properties |
|---|---|---|---|---|---|---|---|---|---|---|---|
| | Type | Thickness μm | Melting point (Tm$_1$) ° C. | Type | Thickness μm | Melting point (Tm$_2$) ° C. | layer Thickness μm | melting point (Tm$_1$ − Tm$_2$) ° C. | Upper limit temperature for sealing ° C. | Sealing strength N/15 mm | Puncture strength N |
| Ex. 1 | uniaxially stretched HDPE | 25 | 139.0 | Unstretched | 60 | 107.0 | — | 32.0 | 180 | 37.2 | 6.9 |
| Ex. 2 | uniaxially stretched HDPE | 25 | 132.2 | LLDPE | | | — | 25.2 | 155 | 33.9 | 7.1 |
| Ex. 3 | uniaxially stretched HDPE | 30 | 132.2 | | | | — | 25.2 | 155 | 24.4 | 8.5 |
| Ex. 4 | uniaxially stretched HDPE | 25 | 132.2 | | 30 | | 30 | 25.2 | 155 | 32.3 | 6.7 |

TABLE 1-continued

|  | First layer | | | Second layer | | | Recycled layer Thickness μm | Difference in melting point (Tm$_1$ – Tm$_2$) °C. | Upper limit temperature for sealing °C. | Sealing strength N/15 mm | Laminate physical properties Puncture strength N |
|---|---|---|---|---|---|---|---|---|---|---|---|
|  | Type | Thickness μm | Melting point (Tm$_1$) °C. | Type | Thickness μm | Melting point (Tm$_2$) °C. | | | | | |
| Comp. Ex. 1 | unstretched HDPE | 30 | 130.6 |  | 60 |  | — | 23.6 | 135 | 1.7 | 4.3 |
| Comp. Ex. 2 | unstretched HDPE | 40 | 128.9 |  |  |  | — | 21.9 | 135 | 1.1 | 4.3 |

As shown in Table 1, Examples 1 to 4, in which the difference (Tm$_1$–Tm$_2$) between the melting point Tm$_1$ of the first layer and the melting point Tm$_2$ of the second layer is 24.0° C. or more, exhibited a high upper limit temperature for sealing and a high sealing strength due to sufficient melting of the second layer during heat sealing. Moreover, the puncture strength was also high since a stretched film was used for the first layer. In contrast, Comparative Examples 1 and 2, in which the difference in inciting point (Tm$_1$–Tm$_2$) is less than 24.0° C., exhibited a low upper limit temperature for sealing and a low sealing strength compared with Examples 1 to 4. Moreover, the puncture strength was low compared with Examples 1 to 4 since an unstretched film was used for the first layer. In the table, the resin type in the "Type" columns of the first layer and the second layer indicates a resin type contained as a main component.

Example 5

A packaging bag (130 mm×213 mm) open on one side was produced using the laminate prepared in Example 1. Specifically, two laminates were prepared as in Example 1, and either of the laminates was placed on top of the other such that the respective second layers face each other. Next, seal bars set to 180° C. were pressed on the first layer surfaces corresponding to each seal portion, and seal portions were formed on sides excluding one side for filling with contents. A packaging bag was thus obtained. Subsequently, the packaging bag was filled with 300 g of water as the contents from the remaining open side, and the side was similarly heat-sealed at 180° C. to produce a packaging bag filled with the contents. Even when the packaging bag filled with the contents was positioned horizontal to the floor and dropped from the height of 100 cm five times, the breakage did not occur.

Example 6

A packaging bag filled with the contents was produced in the same manner as Example 5 except for using laminates prepared as in Example 2 and changing the set temperature of the seal bars to 155° C. Even when the packaging bag filled with the contents was positioned horizontal to the floor and dropped from the height of 100 cm five times, the breakage did not occur.

Example 7

A packaging bag filled with the contents was produced in the same manner as Example 5 except for using laminates prepared as in Example 3 and changing the set temperature of the seal bars to 155° C. Even when the packaging bag filled with the contents was positioned horizontal to the floor and dropped from the height of 100 cm five times, the breakage did not occur.

Example 8

A packaging bag filled with the contents was produced in the same manner as Example 5 except for using laminates prepared as in Example 4 and changing the set temperature of the seal bars to 155° C. Even when the packaging bag filled with the contents was positioned horizontal to the floor and dropped from the height of 100 cm five times, the breakage did not occur.

Comparative Example 3

A packaging bag filled with the contents was produced in the same manner as Example 5 except for using laminates prepared as in Comparative Example 1 and changing the set temperature of the seal bars to 135° C. When the packaging bag filled with the contents was positioned horizontal to the floor and dropped from the height of 100 cm, the breakage occurred.

Comparative Example 4

A packaging bag filled with the contents was produced in the same manner as Example 5 except for using laminates prepared as in Comparative Example 2 and changing the set temperature of the seal bars to 135° C. When the packaging bag filled with the contents was positioned horizontal to the floor and dropped from the height of 100 cm, the breakage occurred.

REFERENCE SIGNS LIST

1 First layer
2 Second layer
3 Adhesive layer
4 Recycled layer
5 Body portion
6 Bottom portion
7 Side seal
8 Bottom seal
9 Top seal
10 Nozzle section
11 Tear line
12 Tip portion

The invention claimed is:
1. A laminate consisting of:
a first layer having a melting point of Tm$_1$ and containing a first polyethylene alone as a resin;

a second layer having a melting point of $Tm_2$ and containing a second polyethylene alone as a resin, an adhesive layer containing an adhesive for bonding the first layer and the second layer, wherein:

the first layer and the second layer are disposed respectively as outermost surfaces of the laminate;

$Tm_1 - Tm_2 \geq 24.0°$ C. is satisfied;

the first layer is a stretched film of high density polyethylene (HDPE);

the second layer is an unstretched film of linear low density polyethylene (LLDPE);

the adhesive is at least one selected from the group consisting of urethane, acid-modified polyolefin, polyester, polyether, and polyamide adhesives; and the thickness ratio of the second layer is 55 to 90% relative to 100% for the thickness of the entire laminate.

2. The laminate according to claim 1, wherein the second layer has a thickness ratio of 50 to 90% relative to 100% for a total thickness of the first layer and the second layer.

3. The laminate according to claim 1, wherein a mass ratio of polyethylene contained in the laminate is 90 mass % or more relative to 100 mass % for all the resins contained in the laminate.

4. The laminate according to claim 1, wherein the laminate does not contain nylon.

5. A packaging bag comprising the laminate according to claim 1.

6. The packaging bag according to claim 5, for storing a liquid.

7. A method of manufacturing a packaging bag, comprising heat sealing the laminate according to claim 1.

8. The method of manufacturing a packaging bag according to claim 7, wherein a temperature for the heat sealing is 130° C. or higher.

* * * * *